Figure 1:
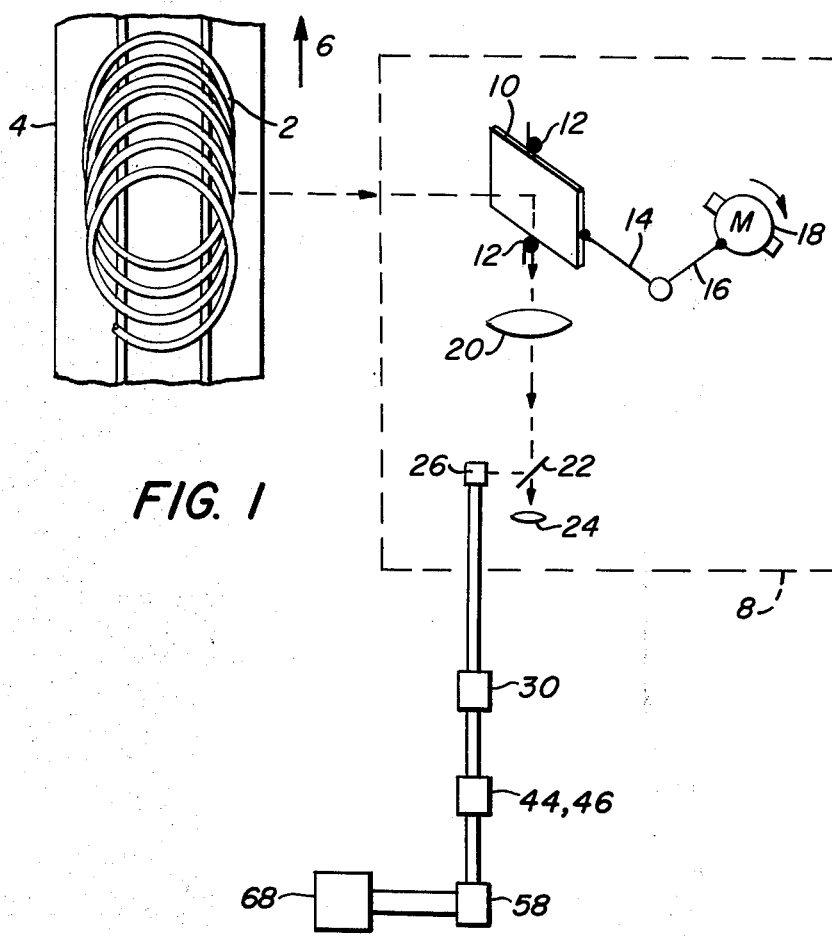

United States Patent [19]
Murray

[11] 4,008,616
[45] Feb. 22, 1977

[54] SCANNING PYROMETER

[75] Inventor: Thomas P. Murray, Churchill Borough, Pa.

[73] Assignee: United States Steel Corporation, Pittsburgh, Pa.

[22] Filed: Oct. 20, 1975

[21] Appl. No.: 624,024

[52] U.S. Cl. ............................................. 73/355 R
[51] Int. Cl.² ...................................... G01K 13/06
[58] Field of Search .................. 73/355 R, 355 EM

[56] References Cited
UNITED STATES PATENTS

| 2,008,793 | 7/1935 | Nichols | 73/355 R X |
|---|---|---|---|
| 3,435,237 | 3/1969 | Collins | 73/355 R X |
| 3,510,057 | 5/1970 | Werme | 73/355 R X |
| 3,696,678 | 10/1972 | Mossey | 73/355 R X |
| 3,855,864 | 12/1974 | Douglas | 73/355 R |

Primary Examiner—Jerry W. Myracle
Attorney, Agent, or Firm—Rea C. Helm

[57] ABSTRACT

A scanning pyrometer for measuring the temperature of moving material having a plurality of separate components has an oscillating mirror in an optical system focusing thermal radiation from the moving material on a thermal radiation detector. Temperature is determined by circuitry providing an electrical signal representative of the peaks of the pulses output of the detector.

5 Claims, 3 Drawing Figures

SCANNING PYROMETER

This invention relates to a temperature measuring device and more particularly to a scanning pyrometer for measuring the temperature of material whose exact location varies.

In the production of hot rolled steel rod, the rod travels through a rolling mill in a straight line, moving at a very high speed, until it arrives at a laying cone. The laying cone deposits the rod in overlapping rings on a moving conveyor which carries the rod to the delivery end of the mill. Accurate continuous knowledge of the rod temperature at the laying cone is essential for proper control of product quality. This temperature is largely determined by the amount of cooling provided in water boxes through which the rod passes before entering the laying cone. After the rod is deposited on the moving conveyor, it is cooled by blowers mounted beneath the conveyor bed, and if the cooling is not properly controlled a poor microstructure may result.

Conventional pyrometers with a large field of view and relatively slow response time do not provide an accurate temperature determination of the rod even at the coil edges where the rod is a more or less solid mass of hot metal. Additional problems arise when uncontrolled coiling diameter changes move the coil edge away from the pyrometer field of view.

In accordance with my invention the pyrometer views the hot target by reflection from an oscillating mirror. As the mirror oscillates, the field of view of the pyrometer traverses a fixed path back and forth. The pyrometer will read and hold the maximum sensed temperature of a hot object in this path as the object passes through the field of view. The maximum sensed temperature is thus displayed or recorded.

It is therefore an object of my invention to provide a scanning pyrometer for measuring the maximum temperature of moving material.

Another object of my invention is to provide a scanning pyrometer for measuring the temperature of moving material which does not have a fixed pass line.

Still another object is to provide a pyrometer for measuring the temperature of moving spaced apart hot material.

Figure 2:
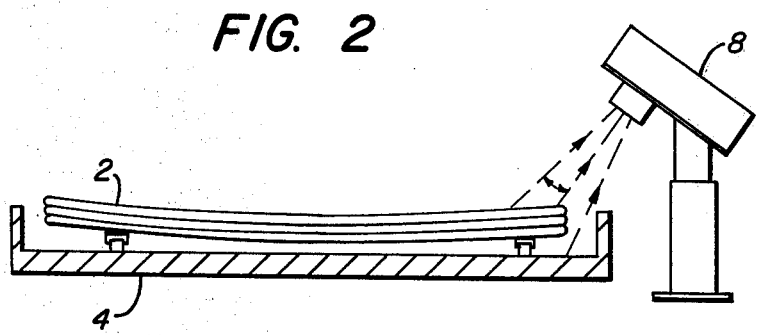
Figure 3:
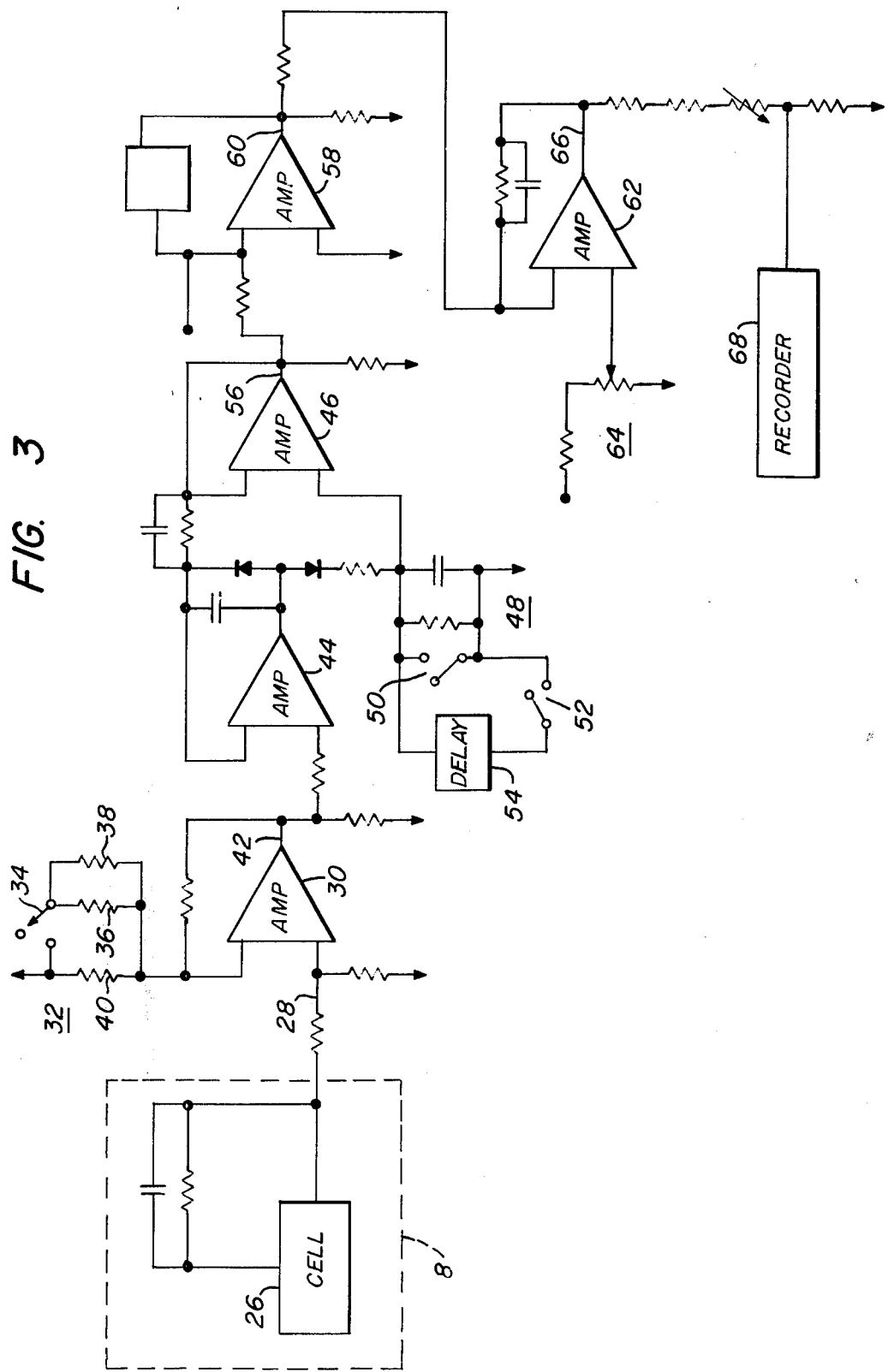

These and other objects will become more apparent after referring to the following specification and drawings in which FIG. 1 is a schematic drawing of the scanning pyrometer, FIG. 2 is an end elevational schematic drawing showing a coil on a conveyor and its relation with the scanner, and FIG. 3 is a circuit diagram of the electronic circuitry of the scanning pyrometer.

Referring now to the drawings, reference numeral 2 refers to a hot rod, whose temperature is to be determined. Part of a rod coil is shown in FIG. 1 and is assumed to have been placed on a conveyor 4 by a rod mill laying cone (not shown) in a spiral fashion for movement along conveyor 4 in the direction of arrow 6. A sensing head 8 is mounted adjacent the laying cone and conveyor 4. Sensing head 4 includes an oscillating mirror 10 mounted to rock back and forth about mounting pivots 12. A rocker arm 14 connects mirror 10 to a connecting link 16. Link 16 is attached slightly off center to the end of a drive shaft of a drive motor 18. Sensing head 8 also includes an adjustable objective lens 20, a beam splitter 22 and an eyepiece lens 24 arranged so that radiant energy from the rod may be reflected by mirror 10 and focused on a silicon cell pyrometer 26 through objective lens 20 and beam splitter 22. Pyrometer 26 may be a Model 509-50 Optical Detector manufactured by the Control Products Division of Bell & Howell Company, Bridgeport, Conn. and includes a preamplifier.

Pyrometer 26 has an output connection 28 connected to the input of an amplifier 30 which may be a Model 1029 amplifier as manufactured by Teledyne Philbrick, Dedham, Mass. Amplifier 30 has a gain control circuit 32 with a switch 34 which, when closed, connects a resistance 36 and a resistance 38 in parallel with a resistance 40.

Amplifier 30 has an output connection 42 connected to the input of a peak picker circuit. The peak picker circuit includes an amplifier 44 which may be a Model 1029 amplifier manufactured by Teledyne Philbrick connected to an amplifier 46 which may be a Model 1026 amplifier manufactured by Teledyne Philbrick. The peak picker circuit includes a reset circuit 48 with a reset switch 50 connected in parallel with a control switch 52 in series with a delay circuit 54.

Amplifier 46 has an output connection 56 connected to the input of a logarithmic amplifier 58 which may be a Model 4350 amplifier manufactured by Teledyne Philbrick. Amplifier 58 has an output connection 60 connected to the input of an amplifier 62 which may also be a Model 1026 amplifier and acts as an inverter. Amplifier 62 has a zero adjust circuit 64 and has an output connection 66 connected to the input of a recorder 68.

To operate the scanning pyrometer, the sensing head is aligned with respect to the moving rods on the conveyor so that the scan is preferably at right angles to the direction of travel and the field of view includes the edge of the coils (FIG. 2) where the overlapping of the coil rings is the greatest. The sensing head is mounted a convenient distance away from the conveyor and may be enclosed in a water-cooled box if components are heat sensitive. The eyepiece lens and the objective lens are manipulated to bring the rods in focus on the silicon cell and to align the sensing head on the desired target area. The pyrometer should be calibrated in the conventional manner by sighting on a black body source with switch 34 open. In that position the gain of amplifier 30 is set for on emittance of 1.0. For measuring the temperature of hot steel switch 34 is closed which changes the gain of the amplifier 30 to a setting for an emittance of 0.8. Switch 50 is momentarily closed to reset the pyrometer and the pyrometer is then ready for use.

As mirror 10 oscillates, the pulses of infrared radiation, one for each loop of the coil scanned, fall on silicon cell 26 and are converted to electrical pulses at output 28. These pulses are amplified and become output 42. Output 56 is a dc output proportional to the pulse height of the pulses at output 42. When small diameter rods are moving on conveyor 4, the silicon cell is irradiated a relatively short time, so that it is necessary to use a fast response silicon cell pyrometer.

Since output 56 is non-linear with respect to the temperature, it is convenient to linearize the output by using logarithmic amplifier 58. Amplifier 62 serves to convert output 60 into a positive voltage increasing with temperature, the type signal required for most recorders. A calibrated voltmeter may be used to display the temperature, or output 66 may also be used for cooling control purposes.

For tracking reasons the immediate front end and the tail end of a rod are much hotter than the bulk of the rod. Since the slow decay rate of the peak picker circuit might retain a high reading for too long a period of time, switch 52 and delay circuit 54 are provided to eliminate the high temperature indications from the rod ends. Switch 52 and delay circuit 54 are connected to a hot metal detector (not shown) at the looper of the rod mill and delay circuit 54 functions to keep switch 52 closed during passage of the hot leading and tailing ends of each rod.

I claim:

1. A scanning pyrometer for measuring the maximum temperature of moving material having a plurality of separate components which may occur in a non-uniform pattern comprising:
    a thermal radiation detector for providing an electrical output in response to thermal radiation received by the detector,
    an optical system for focusing thermal radiation from part of the separate components of the material on the detector,
    oscillating means in said optical system whereby the detector receives radiation from traversing a region generally transverse to the direction of movement of the separate components and said electrical output is a series of electrical pulses from each traverse, each electrical output being representative of the temperature of a separate component, and
    means connected to said detector for providing a continuous electrical signal representative of the peaks of said electrical pulses.

2. A scanning pyrometer according to claim 1 in which the means for providing a continuous electrical signal includes an amplifier and a gain control for said amplifier.

3. A scanning pyrometer according to claim 2 in which the thermal radiation detector is a silicon cell.

4. A scanning pyrometer according to claim 3 in which the means for providing a continuous electrical signal includes a logarithmic amplifier.

5. A scanning pyrometer according to claim 4 in which the means for providing a continuous electrical signal includes means responsive to a change in the movement of said material for eliminating selected temperature indications.

\* \* \* \* \*